April 21, 1936. G. H. KENNEDY, JR Re. 19,934

ENVELOPE

Original Filed Oct. 11, 1933 2 Sheets-Sheet 1

Inventor:
George H. Kennedy Jr.
By
Fowler & Kennedy
Attorneys

April 21, 1936. G. H. KENNEDY, JR Re. 19,934

ENVELOPE

Original Filed Oct. 11, 1933 2 Sheets-Sheet 2

Inventor:
George H. Kennedy Jr.
By Fowler & Kennedy
attorneys

Reissued Apr. 21, 1936

Re. 19,934

UNITED STATES PATENT OFFICE 19,934

ENVELOPE

George H. Kennedy, Jr., Worcester, Mass., assignor to United States Envelope Company, Springfield, Mass., a corporation of Maine Original No. 2,026,837, dated January 7, 1936, Serial No. 693,163, October 11, 1933. Application for reissue February 17, 1936, Serial No. 64,368

7 Claims. (Cl. 229—80)

The present invention relates to envelopes, and has for its object to provide an improved envelope of the type which does not require moistening of its seal flap in order to effectively seal it, as is necessary with ordinary envelopes.

In United States Letters Patent No. 1,768,836 issued July 1, 1930, there is shown and described an envelope which does not require moistening in order to seal it, this patented envelope having complemental areas of its seal flap and rear wall coated with an adhesive which sticks upon contact with itself, but not with uncoated areas. Consequently, when the flap is folded over, disposing its gummed or coated area in registering relation with the gummed or coated wall area, and pressure is applied to the overlying areas, the envelope is sealed. Such dry-sealing envelopes, however, cannot be packed or handled in the ordinary way, because the slightest contact of their complemental coated areas causes them to become prematurely sealed; it has therefore been proposed (see United States Letters Patent No. 1,800,143, April 7, 1931) to interpose removable strips of paper between the gummed or coated surfaces but this is an expedient which greatly increases the cost, and detracts materially from the commercial value of such envelopes.

According to the present invention, there is provided a dry-sealing envelope construction which permits such envelopes to be packed and boxed in the usual way with their seal flaps folded down, and in which the gummed or coated areas are effectively prevented from inadvertently coming into contact prior to the actual sealing of the envelope. The envelope is also constructed so that it can be readily manufactured by existing envelope making machines, without any special precautions being taken in packing the completed envelopes. The above and other advantageous features of the invention will hereinafter more fully appear from the following description with reference to the accompanying drawings, in which—

Like reference characters refer to like parts in the different figures.

Figure 1:
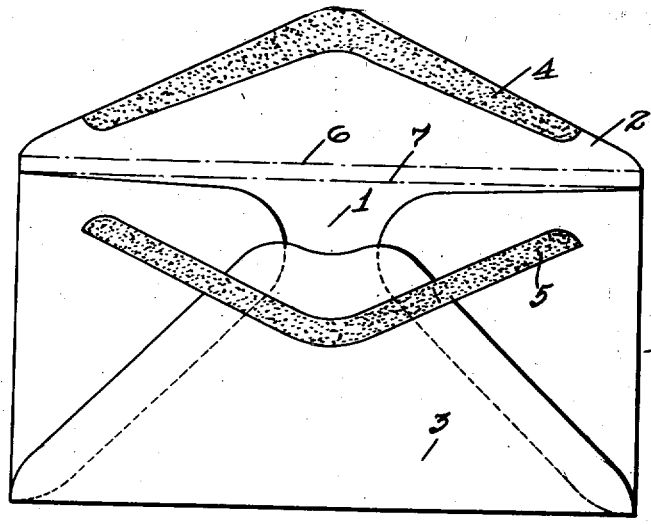
Fig. 1 is a rear view of an envelope with adhesive applied thereto in accordance with the invention.

Referring first to Fig. 1, the envelope utilized for the purpose of embodying the invention is shown as being of usual form with a front wall 1, seal flap 2 and a rear wall 3 constituted by side and bottom flaps folded over and adhesively secured together at their overlapping edges. Suitably shaped bands of dry-sealing adhesive 4 and 5 are provided on the seal flap 2 and rear wall 3 respectively, it being noted that the gumming or coating 5 is farther removed from the envelope's usual score line 6 between the flap 2 and the front wall 1, than is the gumming or coating 4. The gumming or coating 4 and 5 is of such a character that when dry the gummed or coated areas will adhere to each other when pressed together, but no such adhesion occurs from either area coming into contact with the material of which the envelope is made. Preferably the gumming or coating 4 and 5 is applied in the form of a rubber solution, such as natural or compounded latex, or rubber cement which is allowed to dry, the invention also contemplating the use of other adhesives possessing the same general characteristics as described above.

Figure 2:
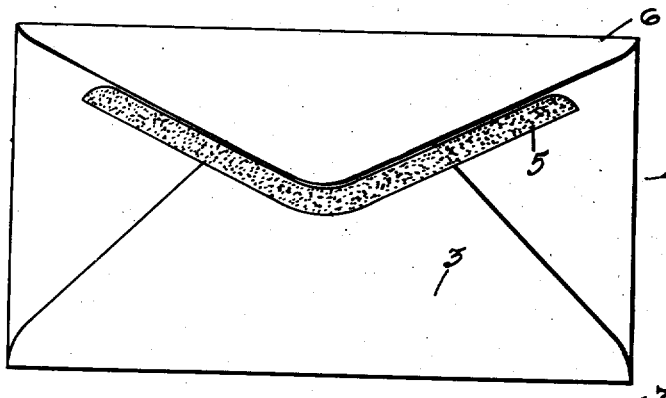
Fig. 2 illustrates folding of the envelope of Fig. 1 preparatory to packing, without registration of the gummed or coated areas.

When the seal flap 2 is folded along the score line 6 preparatory to packing, as shown in Fig. 2, it is evident that the gumming or coating 4 on the folded flap 2 will be entirely concealed and cannot possibly register with the gumming or coating 5 on the rear envelope wall 3 due to the unequal displacement of the gummed or coated areas with respect to score line 6. Consequently, the seal flaps of envelopes constructed as shown in Fig. 1 may be folded and the envelopes packed by existing envelope folding and packing machinery, without any possibility of the gummed or coated areas inadvertently coming into contact with each other to cause premature sealing of the envelopes.

Figure 3:
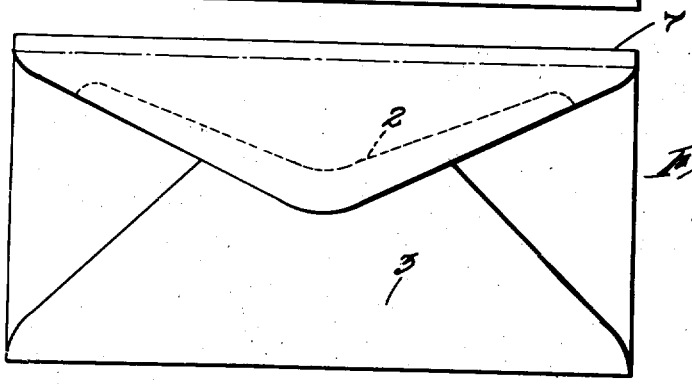
Fig. 3 shows the envelope of Fig. 1 in a sealed condition.

Referring again to Fig. 1, it is to be noted that the side flaps constituting a portion of the rear wall 3 do not extend upwardly to the score line 6 which provides, as above described, the packing fold, but terminate short of said line 6, thus permitting folding of flap 2 on a secondary line 7 offset inwardly of and extending parallel to the score line 6. When it is desired to use the envelope, the previously folded flap 2 is turned back with its gummed or coated edge exposed, so that after insertion of the closure in the envelope, it can be sealed by folding down the seal flap 2 along the secondary score line 7, as shown in Fig. 3. This brings the gumming or coating 4 and 5 into exact registration, so that the sealing is completed by merely exerting pressure on the overlying gummed or coated areas. A very slight displacement between the score lines will be sufficient to prevent overlapping of the gumming or coating when the envelope is first folded for packing, as shown in Fig. 2. This is due to the fact that when the seal flap 2 is finally folded for sealing as shown in Fig. 3, it is shifted, with reference to the rear wall 3, twice the distance between the score lines 6 and 7.

When the envelope has been closed by exerting pressure on the overlying gummed or coated areas, the adhesion between the gummed or coated areas is such that the envelope cannot be surreptitiously opened, as by steaming, due to the fact that the rubber solution is waterproof. Furthermore, any attempt to separate the flap 2 from the rear wall 3 by pulling will inevitably result in separating the gumming or coating from one or the other of the paper surfaces, or in tearing of the paper itself, either of which results prevents the envelope from being resealed.

Figure 4:
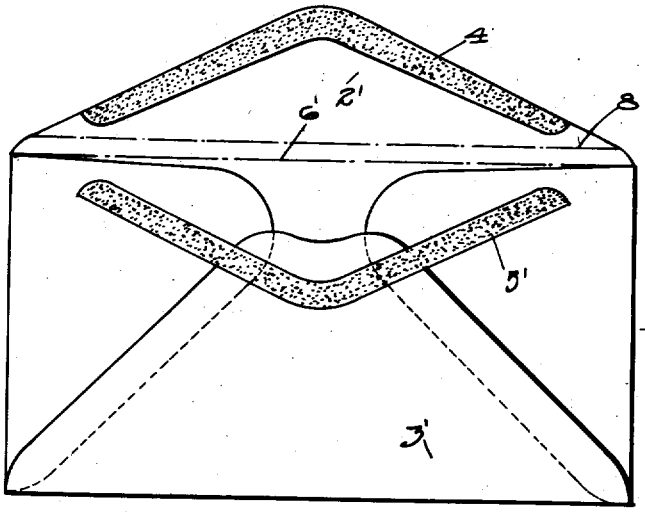
Fig. 4 is a rear view of a modified form of envelope with adhesive applied thereto in accordance with the invention.
Figure 5:
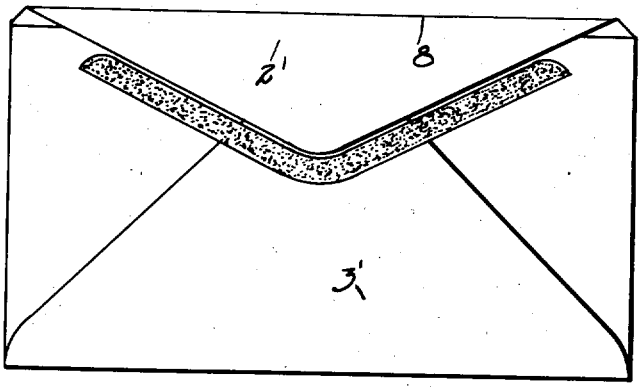
Fig. 5 illustrates folding of the envelope of Fig. 4 preparatory to packing, without registration of the gummed or coated areas.
Figure 6:
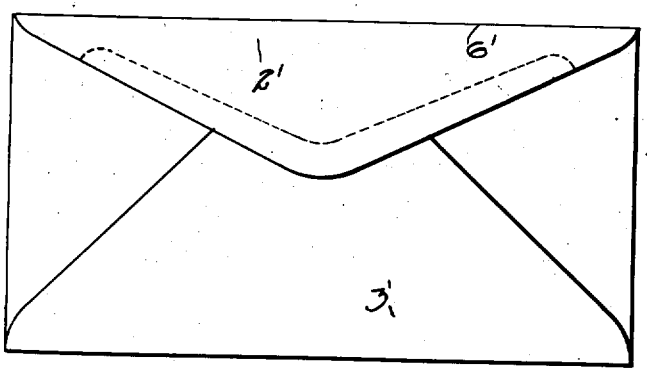
Fig. 6 shows the envelope of Fig. 4 in a sealed condition.

Referring now to Figs. 4 to 6 inclusive, there is shown a modified form of envelope in which the seal flap 2′ is provided with a secondary score line 8 spaced from the usual score line 6′ between the seal flap and the rear wall 3′, the seal flap 2′ and the rear wall 3′ being provided with gumming or coating 4′ and 5′ located symmetrically with respect to the score line 6′. When the seal flap 2′ is folded along the score line 8 preparatory to packing, as shown in Fig. 5, it is evident that the gumming or coating 4′ on the folded flap 2′ will be concealed and cannot register with the gumming or coating 5′ on the rear wall 3′, due to the unequal displacement of the gummed or coated areas with respect to score line 8. Consequently, envelopes with their seal flaps initially folded as shown in Fig. 5, can be packed in the usual manner without any possibility of the gummed or coated areas inadvertently coming into contact with each other to cause premature sealing of the envelopes.

When it is desired to use the envelope, the flap 2′ is turned back with its gummed or coated edge exposed as shown in Fig. 1, so that after insertion of the closure in the envelope, it can be sealed by folding down the seal flap 2′ along the score line 6′, as shown in Fig. 6. This brings the gumming or coating 4′ and 5′ into exact registration, so that the sealing is completed by merely exerting pressure on the overlying gummed or coated areas. The displacement between the score lines 6′ and 8 is substantially the same as the displacement between score lines 6 and 7 of Fig. 1, it being evident that a very slight displacement between the score lines will be sufficient to prevent overlapping of the gumming or coating when the envelope is first folded for packing, as shown in Fig. 5.

From the foregoing, it is apparent that by the present invention there is provided an envelope which does not require any moistening in order to seal it, the envelope being so constructed that the gummed or coated areas which are adapted to adhere when engaged with each other are maintained out of engagement, thus permitting the envelopes to be packed in the usual manner without possibility of inadvertent adhesion between the gumming or coating on the seal flaps and the rear walls of the envelopes.

I claim,

1. An envelope having complemental areas of its seal flap and rear wall gummed or coated with an adhesive of a type adapted to adhere to itself upon the application of pressure alone, said envelope having spaced lines of folding, one to permit folding of the seal flap without registration of the gummed or coated areas and the other to bring said gummed or coated areas into register.

2. An envelope having complemental areas of its seal flap and rear wall gummed or coated with an adhesive of a type adapted to adhere to itself upon the application of pressure alone, said envelope having spaced score lines for folding said seal flap either with said gummed or coated areas offset for packing, or with said gummed or coated areas in register for sealing.

3. An envelope having complemental areas of its seal flap and rear wall gummed or coated with an adhesive of a type adapted to adhere to itself upon the application of pressure alone, said envelope providing spaced score lines between the seal flap and front wall to permit said seal flap to be folded over with or without registration of said gummed or coated areas.

4. An envelope having complemental areas of its seal flap and rear wall gummed or coated with an adhesive having the property of adhering to itself upon contact without adhering to the envelope material, said envelope having spaced lines of folding, one to permit folding down of the seal flap without registration of the gummed or coated areas, and the other to bring said gummed or coated areas into register for sealing of the envelope by the application of pressure alone.

5. An envelope or the like of the class described, whose body portion and closure portion have complemental areas coated, for dry-sealing purposes, with adhesives adapted to adhere to themselves upon non-moistened contact, there being a line of fold for said closure portion which obtains registration of said areas, and another line of fold, offset outwardly of said first line, on which said closure portion is foldable to keep said areas out of registration.

6. An envelope or the like of the class described, whose body portion and closure portion have complemental areas coated, for dry-sealing purposes, with adhesives adapted to adhere to themselves upon non-moistened contact, said closure portion having a line of fold on which it is foldable against said body portion, for packing purposes, to offset said coated areas from each other, and said closure portion being foldable elsewhere to obtain registration of said coated areas with each other.

7. An envelope or the like of the class described, having front and back walls and a closure flap, the latter providing an area coated with dry-sealing adhesive and adapted to adhere upon non-moistened contact with a similarly coated complemental area of said back wall, said closure flap having a score line closer to one of said areas than to the other, to permit said closure flap, for packing purposes, to be folded down against said back wall with said areas out of registry.

GEORGE H. KENNEDY, JR.